United States Patent
Uchiyama

(10) Patent No.: US 10,568,274 B2
(45) Date of Patent: Feb. 25, 2020

(54) PLANT CULTIVATION DEVICE, CULTIVATION BED RAISING/LOWERING DEVICE, AND PLANT CULTIVATION FACTORY

(71) Applicant: Hisakazu Uchiyama, Hamamatu (JP)

(72) Inventor: Hisakazu Uchiyama, Hamamatu (JP)

( * ) Notice: Subject to any disclaimer, the term of this patent is extended or adjusted under 35 U.S.C. 154(b) by 674 days.

(21) Appl. No.: 14/890,043

(22) PCT Filed: May 8, 2013

(86) PCT No.: PCT/JP2013/062980
§ 371 (c)(1),
(2) Date: Apr. 5, 2016

(87) PCT Pub. No.: WO2014/181417
PCT Pub. Date: Nov. 13, 2014

(65) Prior Publication Data
US 2016/0212947 A1 Jul. 28, 2016

(51) Int. Cl.
*A01G 9/20* (2006.01)
*A01G 9/14* (2006.01)
(Continued)

(52) U.S. Cl.
CPC .............. *A01G 9/20* (2013.01); *A01G 9/143* (2013.01); *A01G 31/00* (2013.01); *Y02A 40/252* (2018.01)

(58) Field of Classification Search
CPC .......... A01G 1/001; A01G 1/042; A01G 9/00; A01G 9/02; A01G 9/023; A01G 9/10;
(Continued)

(56) References Cited

U.S. PATENT DOCUMENTS 3,664,534 A * 5/1972 Hunter ................. B65G 1/0435
414/278
5,615,992 A * 4/1997 Proske ................. B65G 1/0407
414/278
(Continued)

FOREIGN PATENT DOCUMENTS

EP 01917851 * 4/2003
JP 1127351974 A 9/1974
(Continued)

OTHER PUBLICATIONS

WO2012164994 (Year: 2012).*

*Primary Examiner* — Thanh Pham
(74) *Attorney, Agent, or Firm* — Bowdy and Neimark, PLLC

(57) ABSTRACT

The plant cultivation device includes a frame having four columns, cultivation beds a raising/lowering member, and a cultivation spaces. The cultivation beds are positioned one above the other and each is supported by the affixing claws of the frame. The raising/lowering member has an arm for engaging the cultivation beds and drives vertically between adjacent cultivation beds. The cultivation spaces each formed between vertically adjacent cultivation beds. The affixing claws are fixed to the framed storable in the columns and are driven between a supporting position and a non-supporting position. The arm is fixed to the raising/lowering member storable in the raising/lowering member, and is driven between an engaging position and a non-engaging position.

27 Claims, 12 Drawing Sheets

(51) Int. Cl.
*A01G 9/02* (2018.01)
*A01G 31/00* (2018.01)

(58) Field of Classification Search
CPC ........ A01G 9/1066; A01G 9/24; A01G 31/00;
A01G 31/02; A01G 31/06; A01G 9/20;
A01G 9/143; B65G 1/026; B65G 1/0457;
B65G 1/0464; B65G 1/10; B65G 1/12;
B65G 1/137; Y02P 60/10
See application file for complete search history.

(56) References Cited

U.S. PATENT DOCUMENTS

| | | | | |
|---|---|---|---|---|
| 5,879,071 A | * | 3/1999 | Sanford, Jr. | ............. A01G 9/02 362/101 |
| 6,923,612 B2 | * | 8/2005 | Hansl | ................... B65G 1/0435 414/277 |
| 9,457,956 B2 | * | 10/2016 | Adachi | .................... B65G 1/04 |
| 9,693,508 B2 | * | 7/2017 | Marchildon | ............. A01G 9/02 |
| 2012/0324788 A1 | | 12/2012 | Sakura et al. | |

FOREIGN PATENT DOCUMENTS

| | | | |
|---|---|---|---|
| JP | 0923772 | A | 1/1997 |
| JP | 1017115 | A | 1/1998 |
| JP | 10136790 | A | 5/1998 |
| JP | 4651743 | B1 | 3/2011 |
| JP | 201381422 | A | 5/2013 |

* cited by examiner

PLANT CULTIVATION DEVICE, CULTIVATION BED RAISING/LOWERING DEVICE, AND PLANT CULTIVATION FACTORY

FIELD OF INVENTION

The present invention relates to a plant cultivation device, a cultivation bed raising/lowering device, and a plant cultivation factory.

DESCRIPTION OF BACKGROUND ART

Recently, due to the industrialization of the plant cultivation, a plant cultivation device which has a flat surface for plant cultivation and which is to be built in small space, holds great attention.

For example, like shown in Patent Document 1, a plant cultivation shelves which is equipped with a stationary type shelves frame having support columns and beams, a container for cultivation to be movably stored in the shelves frame, a light device arranged above the container, and a plumbing device to feed the nutrients to the container, is proposed. In this plant cultivation shelves, the container is piled to each shelf and unloaded from each shelf by using a lifting device provided outside of the shelves frame.

On the other hand, like shown in Patent Document 2, a cultivation bed raising/lowering device having a cultivation bed, multistage hoisting shelf which holds the cultivation beds, and a supporting rod which supports the hoisting shelf, where each hoisting shelf is vertically driven by each chain fixed to each hoisting shelf, is presented.

PRIOR ART DOCUMENTS

Patent Documents

Patent Document 1: Japanese published patent application No. H10-136790
Patent Document 2: Japanese published patent application No. H09-23772

DESCRIPTION OF THE INVENTION

Problems to be Solved

The plant cultivation shelves of Patent Document 1 is suitable for piling and unloading each cultivation container positioned in the cultivation shelves. However, it will take time and effort to pile or unload all of containers on each cultivation shelf. Further, the invention of Patent Document 2 can pile and unload the unit of hoisting shelf. However, because each hoisting shelf is only hooked by the chain, the strength is weak.

Present invention is for industrialization of the plant cultivation and is directed to provide a raising/lowering device for plant cultivation which can easily pile and unload all of containers positioned on the shelf of the building or the frame, and which has strength as a whole.

Means of Solving the Problem

The plant cultivation device of the present invention is characterized in that it comprises, a frame having columns or columns and beams; cultivation beds positioned one above the other and each supported by an affixing claw of the frame; a raising/lowering member which is equipped with a arm engaging with the cultivation bed and which drives vertically between adjacent cultivation beds; and cultivation spaces partitioned by vertically adjacent cultivation beds; wherein the affixing claw is driven between a supporting state which supports the cultivation bed and a non-supporting state which does not supports the cultivation bed, and; wherein the arm is driven between an engaging state which engages with the cultivation bed and a non-engaging state which does not engages with the cultivation bed.

In the plant cultivation device of above, it is preferable that the affixing claw is fixed to the frame storable in the column and/or the beam, and that the arm is fixed to the raising/lowering member storable in the raising/lowering member. Further, it is preferable that the raising/lowering member is ascendable beyond the uppermost cultivation space and that the raising/lowering member is descendible beyond the lowermost cultivation space.

In the plant cultivation device of above, it is preferable that the raising/lowering members are arranged and that arms on a same level are driven synchronously.

Further, it is preferable that the raising/lowering member extends vertically, that arms are positioned one above the other so that an upper arm can engage with an upper cultivation bed and a lower arm can engage with a lower cultivation bed adjacent to the upper cultivation bed, and that arms are coupled and affixing claws positioned one above the other are coupled.

Moreover, it is preferable that the affixing claw supporting the uppermost cultivation bed and the arm engaging the uppermost cultivation bed, and/or the affixing claw supporting the lowermost cultivation bed and the arm engaging the lowermost cultivation bed, are driven separately from other affixing claw and other arm.

And it is also preferable that the cultivation space is to be sealed with the vertically adjacent cultivation beds.

The driving mechanism of the raising/lowering member may be either equipped with a rack mechanism, a chain mechanism or a cylinder mechanism.

It is preferable that each of the affixing claw and an engaging portion of the cultivation bed which engages with the affixing claw, has a current terminal, where the frame and the cultivation bed are to be conducted when engaged. In that case, it is preferable that a lighting device is fixed on a lower surface of the cultivation bed.

The cultivation bed raising/lowering device of the present invention is characterized in that it comprises, a frame having columns or columns and beams; cultivation beds positioned one above the other and each supported by an affixing claw of the frame; a raising/lowering member which is equipped with a arm engaging with the cultivation bed and which drives vertically between adjacent cultivation beds; and spaces partitioned by vertically adjacent cultivation beds; and that the affixing claw is driven between a supporting state which supports the cultivation bed and a non-supporting state which does not supports the cultivation bed, and that the arm is driven between an engaging state which engages with the cultivation bed and a non-engaging state which does not engages with the cultivation bed. As well, the plant cultivation may be achieved in the space.

The plant cultivation factory of the present invention is characterized in that it comprises the cultivation bed raising/lowering device of the present invention, and a plant cultivation shelves having multi-stage plant cultivation spaces, and that the cultivation bed can be transferred from the cultivation bed raising/lowering device to the plant cultivation space of the plant cultivation shelves. In such a plant cultivation factory, it is preferable to equipped with a cultivation bed transferring device which transfers the cultivation bed from the cultivation bed raising/lowering device to the plant cultivation space of the plant cultivation shelves.

Effect of the Invention

In the plant cultivation device of the present invention, because it is equipped with a frame having columns or columns and beams; cultivation beds positioned one above the other and each supported by an affixing claw of the frame; a raising/lowering member which is equipped with a arm engaging with the cultivation bed and which drives vertically between adjacent cultivation beds; and cultivation spaces partitioned by vertically adjacent cultivation beds, and that the affixing claw is driven between a supporting state which supports the cultivation bed and a non-supporting state which does not supports the cultivation bed, and that the arm is driven between an engaging state which engages with the cultivation bed and a non-engaging state which does not engages with the cultivation bed, the cultivation bed can be moved stably. And because, the cultivation bed is held by the affixing claw which is different with the arm held while moving, the cultivation bed can be positioned accurately.

In the plant cultivation device where the affixing claw is fixed to the frame storable in the column and/or the beam or where the arm is fixed to the raising/lowering member storable in the raising/lowering member, the affixing claw or the arm can be ejected and retracted easily, and the structure can be simplified.

In the plant cultivation device where the raising/lowering member is ascendable beyond the uppermost cultivation space, the cultivation bed can be transferred to the roof and etc.

In the plant cultivation device where the raising/lowering member is descendible beyond the lowermost cultivation space, the cultivation bed can be transferred to the space below the cultivation space.

In the plant cultivation device where raising/lowering members are arranged, and that arms on a same level are to be driven synchronously, the cultivation bed can even more stably ascended and descended, because the cultivation bed is held by arms while lifting and lowering.

In the plant cultivation device where the raising/lowering member is extended vertically, and that arms are positioned one above the other so that an upper arm can engage with an upper cultivation bed and a lower arm can engage with a lower cultivation bed adjacent to the upper cultivation bed, and that arms are coupled and affixing claws positioned one above the other are coupled, cultivation beds arranged one above the other can be moved simultaneously and accurately.

Further, in the case where the affixing claw supporting the uppermost cultivation bed and the arm engaging the uppermost cultivation bed, and/or the affixing claw supporting the lowermost cultivation bed and the arm engaging the lowermost cultivation bed, are driven separately from other affixing claw and other arm, the cultivation bed in the uppermost cultivation space and the cultivation bed in the lowermost cultivation space can be carried in or carried out independently from the other cultivation bed.

In the case where the cultivation space is sealed with the vertically adjacent cultivation beds, the environment of the cultivation space can be controlled particularly.

In the cultivation bed raising/lowering device of the present invention, because it is equipped with a frame having columns or columns and beams; cultivation beds positioned one above the other and each supported by an affixing claw of the frame; a raising/lowering member which is equipped with a arm engaging with the cultivation bed and which drives vertically between adjacent cultivation beds, and spaces partitioned by vertically adjacent cultivation beds; and that the affixing claw is driven between a supporting state which supports the cultivation bed and a non-supporting state which does not supports the cultivation bed, and that the arm is driven between an engaging state which engages with the cultivation bed and a non-engaging state which does not engages with the cultivation bed, cultivation beds can be moved stably, and the transfer of the cultivation bed to or from the multi-stage plant cultivation shelf can be achieved easily.

In the plant cultivation factory, because it is equipped with the cultivation bed raising/lowering device of the present invention, and a plant cultivation shelves having multi-stage plant cultivation spaces, and that the cultivation bed can be transferred from the cultivation bed raising/lowering device to the plant cultivation space of the plant cultivation shelves, the transfer of the cultivation bed to or from the multi-stage plant cultivation shelves can be achieved easily.

EMBODIMENT FOR CARRYING OUT THE INVENTION

Figure 1:
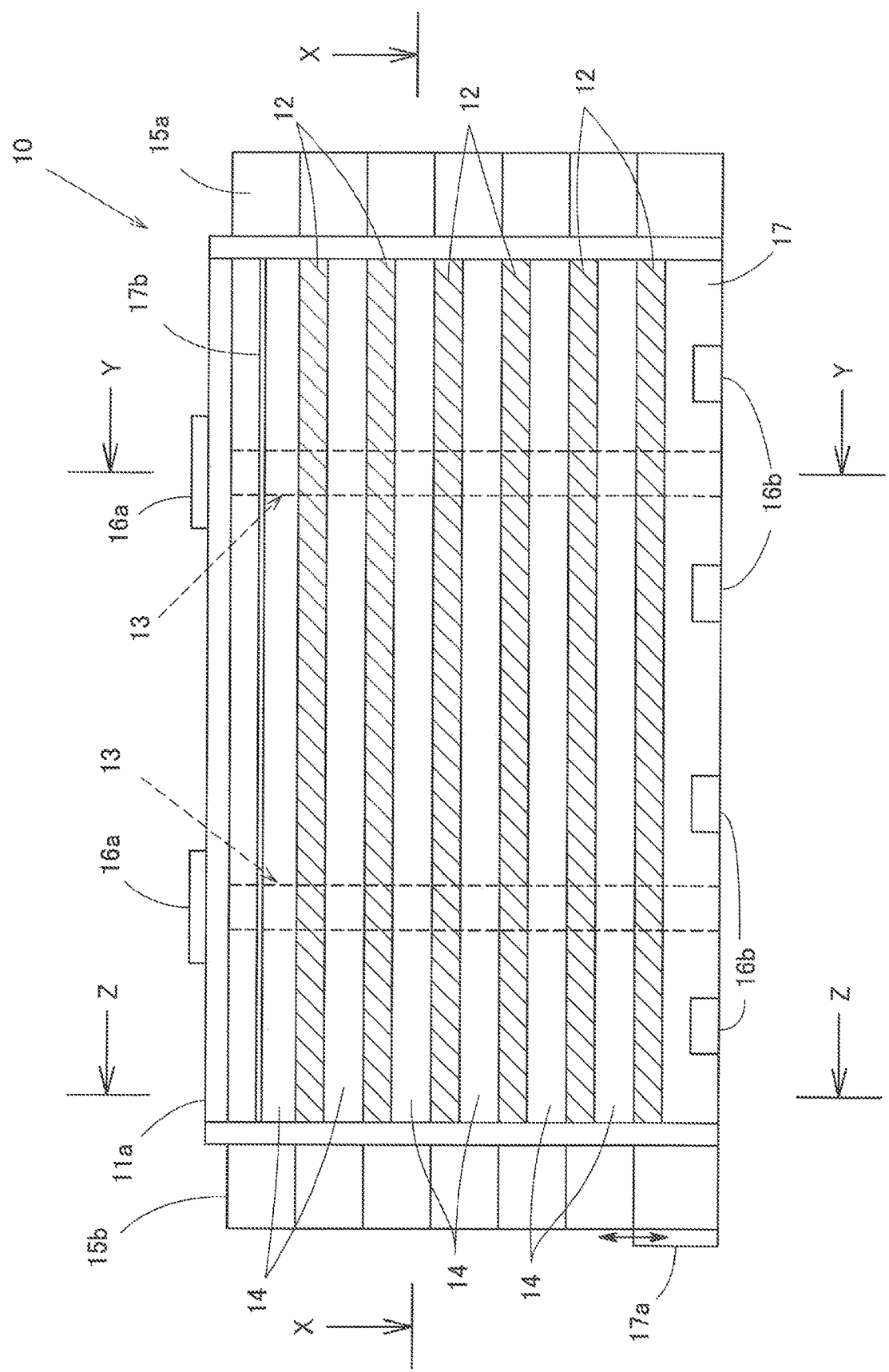
FIG. 1 is a cross sectional view showing an embodiment of the plant cultivation device of the present invention.

A plant cultivation device 10 of FIG. 1 is equipped with a frame 11; a cultivation beds 12 positioned one above the other and each supported by an affixing claw C (see, FIG. 2, 3) of the frame; a raising/lowering member 13 which is equipped with an arm A (see, FIG. 2, 3) engaging with the cultivation bed 12, and which drives up and down; and cultivation spaces 14 each formed between vertically adjacent cultivation beds 12. The affixing claw C is movably stored in the column of the frame 11 and is driven between the stored state and the protruded states. The arm A is movably stored in the raising/lowering member 13 and is driven between the stored state and the protruded state. In this plant cultivation device 10, the plant is cultivated in the cultivation space 14 in the condition where the cultivation bed 12 is supported or held by the affixing claw C, and the cultivation bed 12 is lifted and lowered (ascended and descended) in the condition where the cultivation bed 12 is supported or held by the arm A. However, the cultivation bed may be supported or held both by the affixing claw C and the arm A when in plant cultivation.

The environment, such as temperature, moisture, carbon dioxide level and etc., of each cultivation space 14 is controlled by the air condition 15a and/or air ventilation 15b arranged on the ends of longitudinal direction of each cultivation space of each level. As will be mentioned later, it is structured to have the air to be circulated between the cultivation space 14 and a duct 28 in the cultivation bed 12 (see, FIG. 4).

Figure 2:
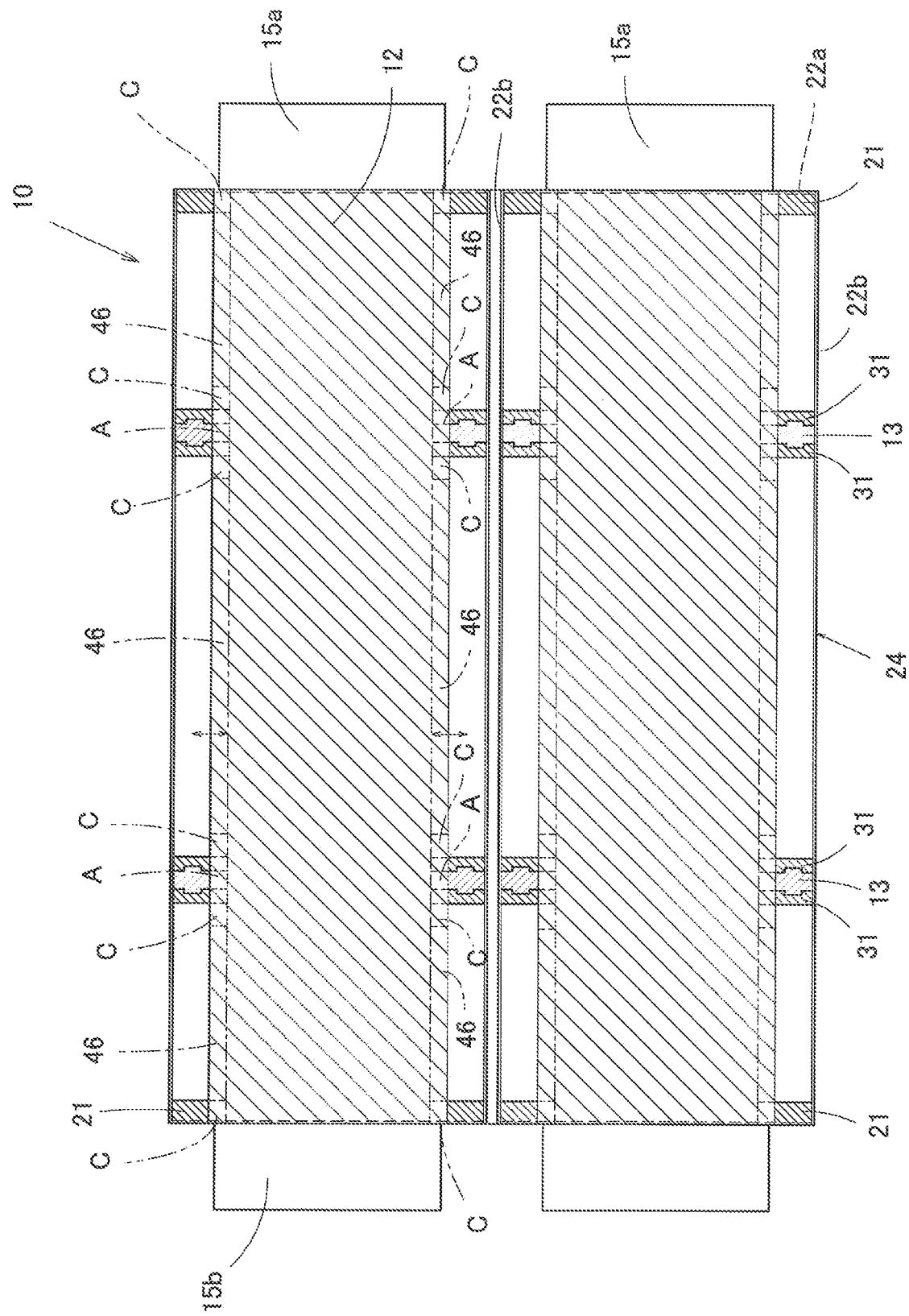
FIG. 2 is X-X line sectional view of FIG. 1.
Figure 3:
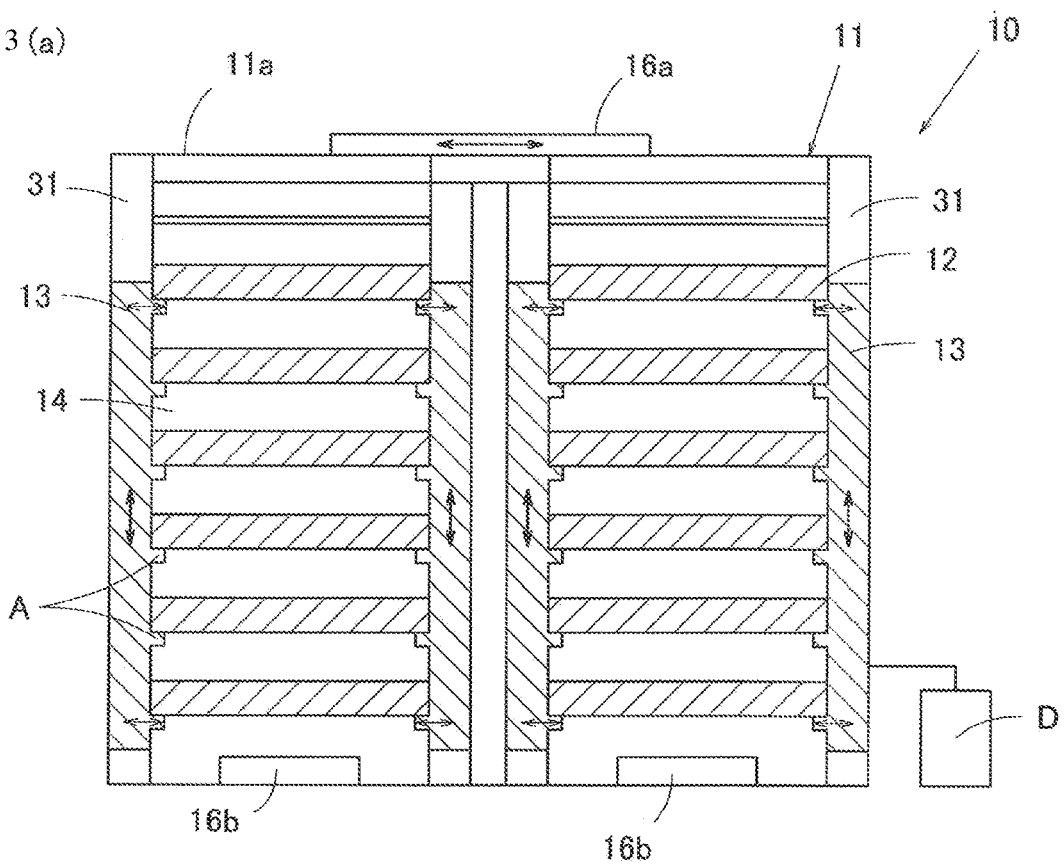
FIG. 3a is Y-Y line sectional view of FIG. 1
FIG. 3b is Z-Z line sectional view of FIG. 1.
Figure 3:
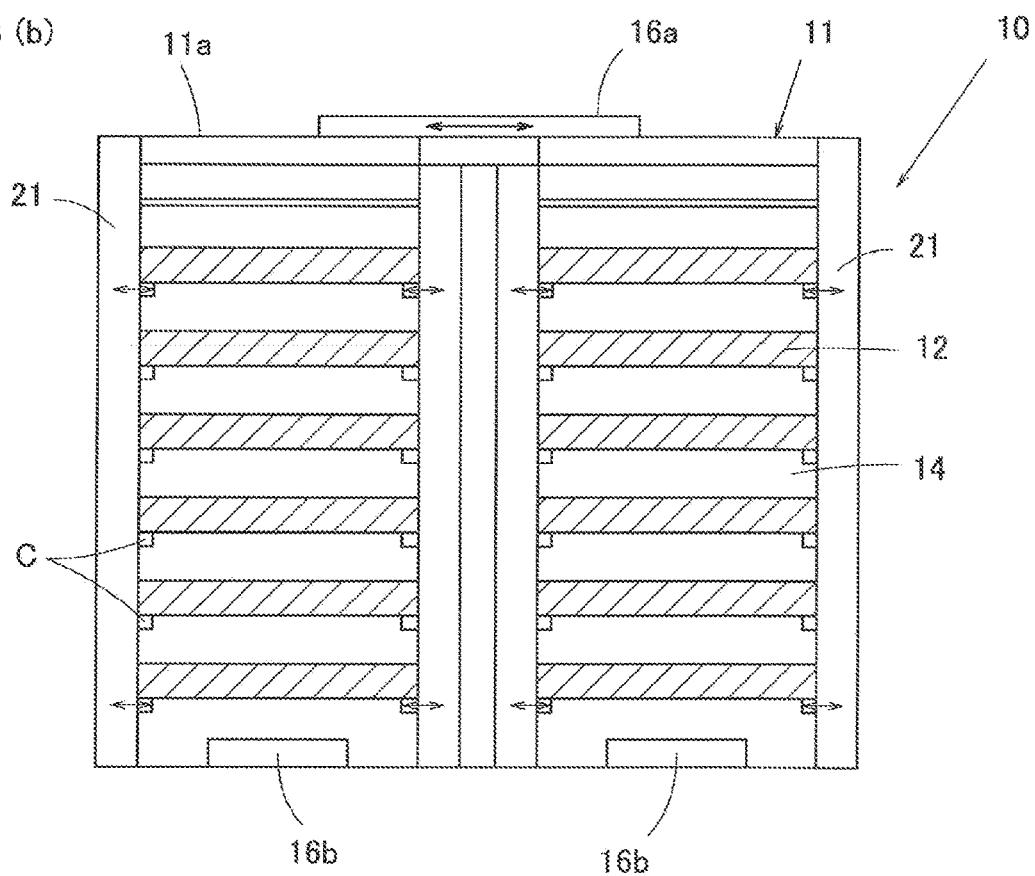

In FIG. 1 to FIG. 3, two plant cultivation devices 10 are built side by side, and a first conveyer 16a is set on the roof (upper surface) 11a of the frame 11 for transferring the cultivation bed 12 from one plant cultivation device 10 to other plant cultivation device 10. The cultivation bed 12 is to be circulated around by using one plant cultivation device 10 for ascending cultivation beds 12 and other plant cultivation device 10 for descending cultivation beds 12. However, the movement locus of the cultivation bed is not limited, and it may be selected according to the content of the cultivation. The length of the first conveyer 16a, for example, is determined to be just longer than the width of the cultivation bed. The first conveyer 16a is set to be movable in left and right direction like an arrow in FIG. 3, so as not to contact with the cultivation bed 12 transferred to the roof. However, the first conveyer 16a may be fixed if there is enough room between two plant cultivation devices 10.

The frame 11, like shown in FIG. 2, is structured to form a rectangular parallelepiped, and is equipped with four columns 21 fixed in rectangle to the ground, beams 22 which couples the columns 21 (longitudinal beams 22a and side beams 22b), and support column 31 positioned between columns 21 and supports the lifting and lowering of the raising/lowering member 13. The support column 31 also structures the frame 11. The support column 31 is a rod body extending in vertical direction, and a depressed portion 31a extending vertically is formed on the lateral face. The support column 31 is arranged to contact with the inner surface of the side beam 22b. A sealing member may be arranged between them or they may be fixed to each other. Further, two support columns 31 are coupled with the coupling member 32 extending vertically to have depressed portions 31a to face each other with a clearance (see, FIG. 5). The raising/lowering member 13 is arranged between the support columns 31. For the first conveyer 16a, a conveyor device such as a conveyer belt, a conveyer roller, a conveyer chain and etc. may be applied.

The frame 11 of FIG. 1 is composed of six cultivation space 14 which holds cultivation beds 12 with the affixing claws C, and a conveying space 17 for transferring the cultivation bed 12 into the lowermost cultivation space. The ceiling of the frame is made to be openable. Therefore, the cultivation bed 12 can be transferred to the first conveyer 16a by moving the cultivation bed 12 from the uppermost space 14 to the roof of the frame 11. In the conveying space 17, the second conveyer 16b for conveying the cultivation bed 12 is provided. For the second conveyer 16b, like the first conveyer 16a, conveyor device such as a conveyer belt, a conveyer roller, a conveyer chain and etc. may be applied. Further, on ends of the conveying space 17, openable doors 17a are provided. And, on the uppermost cultivation space 14, lights 17b are provided separately. The number of the stages of the frame is not limited, if it is more then two stages, it may excess ten. The present invention can stably fixes the cultivation bed and accurately lifts and lowers the cultivation bed despite the large number of stages. And the configuration of the frame 11 is also not limited. In this embodiment, the raising/lowering member 13 is arranged in the support column 31, however, it may be directly arranged in the column 21, if strength of the whole frame is assured.

Further, like shown in FIG. 2, a side wall 24 is arranged between vertically adjacent side beams 22b of the frame 11. Translucency may be given to the side wall 24, by using glass and etc. Therefore, the cultivation condition can be checked from outside. The space between vertically adjacent longitudinal beams 22a communicates said air condition 15a and/or air ventilation 15b and the inside of the frame 11. Therefore, it is not necessary to have wall, however, the frame may be equipped with openable front and back walls.

Figure 4:
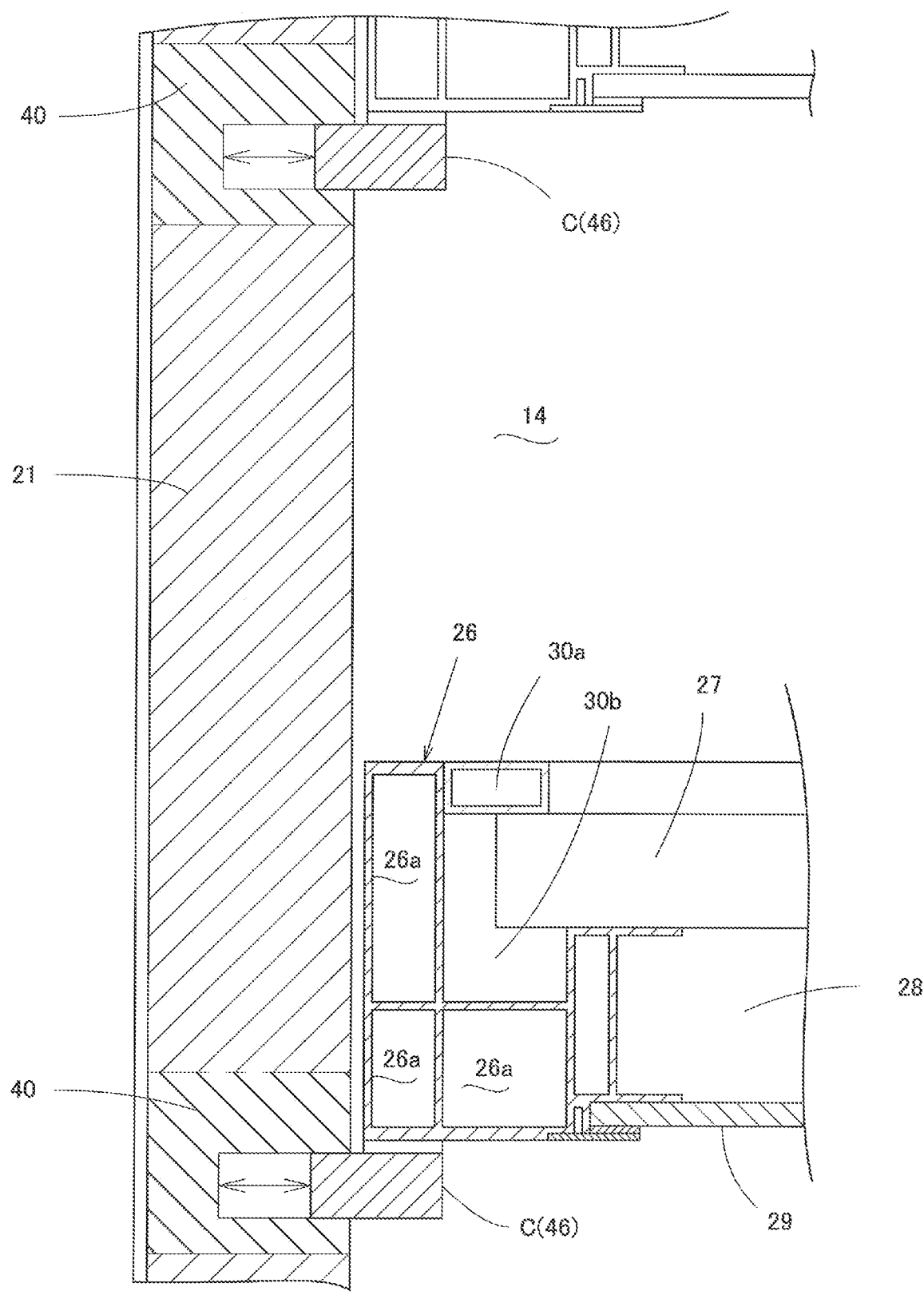
FIG. 4 is a partial enlarged figure of FIG. 1 showing the relation between the plant cultivation bed and the column.

The cultivation bed 12, like shown in FIG. 4, is equipped with two build members 26 extending in longitudinal direction of the flame 11, and a cultivation tub 27, a duct 28, and light device 29 arranged in order from the top and arranged between build members 26. And between them, a pipe 30a for feeding nutrients and a channel 30b for wasting the liquid are provided. However, for the cultivation bed 12, it only needs to be equipped with a cultivation tub which can support and cultivate plants. Therefore, the duct 28 and the light device 29 are not limited and they may be selected according to the plant to be cultivated and the cultivating method. In the case where the light device 29 is arranged on the lower surface of the cultivating bed 27, the flexibility of the number of the plants that can be cultivated will increase, because the wavelength to be radiated to the plant can be controlled. In the case where the duct 28 is arranged between the cultivation tub 27 and the light device 29, it can cool the liquid in the cultivation tub 27 and/or light device 29. Therefore, it facilitates the controlling of air conditioning in the cultivation space. Further, the pipe 30a for feeding nutrients and a channel 30b for wasting the liquid are to be selected according to the cultivation method.

The build member 26 has inner spaces 26a extending in longitudinal direction, and in this inner spaces 26a, electrical wiring and etc. may be laid or cooling water may be circulated. For such a build member 26, a metal material such as aluminum and etc. may be applied.

The cultivation tub 27 is an open space for arranging the cultivating container. In case of hydroponic culture, it is filled with the nutrient solution, and is communicated with the pipe 30a for feeding nutrients and the channel 30b for wasting the liquid. In case of soil culture, it is filled with the soils or the cultivating container is directly arranged, and the nutrient solution are to be directly showered to the plants or cultivating containers. In FIG. 4, the pipe 30a for feeding nutrient solution and the channel 30b for wasting the liquid is arranged, but it may be substituted by the space 26a of the build member 26.

The duct 28 is for sending the air from the air conditioner 15a to the air ventilation 15b, and also cools the heat of the light device 29. In case of the hydroponic culture, it may be structured to control the temperature of the nutrient solution in the cultivation tub 27. The air sent to the air ventilation 15b from the duct 28 is then circulated back to the air conditioner through the cultivation space 14 above the cultivation tub 27. The air condition of the each stage can be easily controlled by circulating the air with each cultivation bed.

The light device 29 comprises a substrate and a light source fixed on the substrate. For the substrate, it is preferable to use metal substrate, more preferably the aluminum substrate. Therefore, the cooling air of the duct 28 can be securely leads to the light source. For the light source, any kind of the light source may be applied, however, LED is preferred.

Like the cultivating bed 12, it is preferably to have the duct 28 arranged between the cultivating tub 27 and the light device 29, so that the it can cools both the cultivating tub 27 and the light device 29.

For the cultivating bed 12, the cultivating containers are aligned in the cultivating tub 27 and then transferred into the plant cultivation device 10 from the conveying space 11*b*.

The raising/lowering member 13, like shown in FIG. 2, is a member which extends in vertical direction and which is movably arranged between two support columns 31. Specifically, the raising/lowering member 13 has protrusions 13*a* on the lateral faces like seen in plain sectional view of FIG. 5, and moves vertically supported by depressed portions 31*a* of the support column 31. Further, the raising/lowering member 13 has first openings 34 (see FIG. 5, 6) on the front face (cultivation space 14 side) aligned vertically in equal distance. The first opening 34 is for housing the arm unit 35 driving the arm in and out. The first opening 34 has a lid 34*a* which allows the arm A to penetrate, like in FIG. 6. The plant cultivation device 10 has four raising/lowering members 13, each arranged in vertical direction. Therefore, the cultivation bed 12 is supported by four arms, when lifting and lowering. However, the number of the raising/lowering members 13 is selected according to the size of the cultivation bed 12.

Back to FIG. 3, the raising/lowering member 13 has six arms A, and constructed to hold six cultivation beds 12 at once. The length of the raising/lowering member 13 and the number of the first opening 34 can be selected according to the lifting and lowering mechanism of the cultivation bed 12. The number of cultivation beds 12 may be larger or smaller than the number of the cultivation space 14. In the case where the number of the cultivation beds 12 is larger than the cultivation space 14, the cultivation bed 12 can be moved to the conveying space 17 or roof at the same time. In the case where the number of the cultivation beds 12 is smaller, the flexibility of the movement of the cultivation beds 12 increases. The lifting and lowering route and the conveying route of the cultivation bed 12, and synchronization of the lifting and lowering of the cultivation beds 12 or individual lifting and lowering of the cultivation beds 12, can be controlled by the cultivation bed controlling program. Further, two or more the raising/lowering members 13 may be arranged vertically on same axis between the support columns 31. In this case, it must be controlled to not clash with each other.

The raising/lowering member 13 is equipped with the lifting and lowering drive unit D (see FIG. 3) having a drive assembly such as motor and etc. and is to be driven up and down by the lifting and lowering drive unit D. As for the lifting and lowering drive unit D, for example, a lifting and lowering drive unit D which is equipped with a chain formed in loop and the drive device rotating chain, and where the chain is coupled to the raising/lowering member 13 may be applied. In this case, the raising/lowering member 13 can be lifted and lowered accurately. As for other lifting and lowering drive unit D, a lifting and lowering drive unit comprising a drive assembly composed of a hydraulic cylinder or a pneumatic ram or a lifting, and lowering drive unit D comprising an actuator which transforms the rotative force of the motor and etc. into the linear force, may be selected.

The raising/lowering member is structured to move between the vertically adjacent cultivation beds 12. Therefore, the lifting and lowering of the cultivation bed 12 from the conveying space 17 to lowermost cultivation space 14 or the uppermost cultivation space 14 to the roof is possible. However, the lifting and lowering (or moving) distance of the raising/lowering member 13 is not limited to this. For example the lifting and lowering distance can be determined according to the length of the raising/lowering member and the numbers of the arm A. For example, when the numbers of the cultivation bed 12 is larger than the numbers of the cultivation space 14, the cultivation bed 12 can be lifted and lowered from the conveying space 17 to the roof by increasing the lifting and lowering distance. And the movement of the raising/lowering member can be controlled by the above said cultivation bed controlling program.

In this embodiment, four raising/lowering members 13 are arranged around the cultivation bed 12. Each of the raising/lowering bed 13 may be interlocked with one another by coupling each with one lifting and lowering drive unit, or it may be independently or separately driven. Or, of all, two raising/lowering members 13 arranged on one line extending in width direction (one of the side beam 22*a*) may be interlocked, and other two raising/lowering members 13 arranged on other line extending in width direction (other of the side beam 22*b*) may be interlocked. Therefore, by lifting and lowering two raising/lowering members 13 arranged on one line, the cultivation bed 12 can be tilted. And by tilting the cultivation bed 12, it can facilitate the discharging of the nutrient liquid or the washing of the cultivation bed. Further, two of the raising/lowering members 13 arranged on the line of length direction may be interlocked. The cultivation bed 12 can be tilted by interlocking the part of all the raising/lowering members.

However, as long as the cultivation bed 12 can be supported, and can be lifted and lowered, the numbers of the raising/lowering members 13 are not limited. And the selecting of the raising/lowering members 13 to be interlocked can be determined appropriately.

Figure 5:
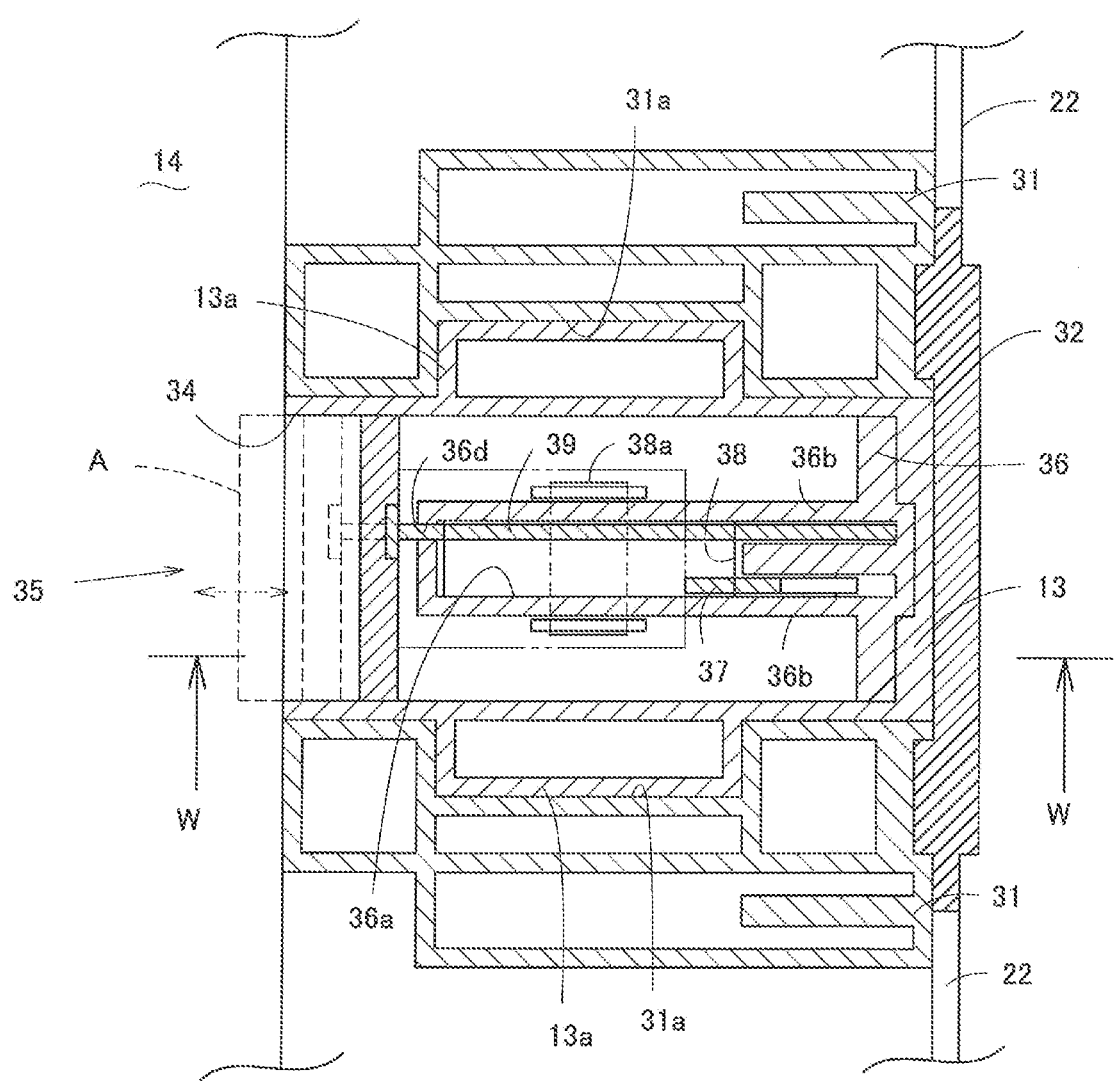
FIG. 5 is plain sectional view showing the arm unit of FIG. 1.

The arm unit 35, like shown in FIG. 5 and FIG. 6*a*, is coupled to the raising/lowering member 13. It comprises a first housing 36 having a penetrating hole 36*a* penetrating vertically; a first longitudinal rack 37 which is arranged in parallel with the raising/lowering member 13 by inserting in the penetrating hole 36*a*, and which connects the arm units 35 of vertical stages; a first sprocket 38 fixed rotatably in the first housing; a first side rack 39 housed movably in the direction to the inside and outside of the frame (front and back direction of FIG. 1); and the arm A coupled to the first side rack 39. The first longitudinal rack 37 is coupled movably in vertical direction against the first housing 30. The note R of FIG. 6*a* is a roller which supports movement of the arm A, the first side rack 39, and the first longitudinal rack 37.

The first housing 36 is a hollow cuboid with two openings formed on top and bottom, and the side walls 36*b* support the axis 38*a* of the first sprocket 38. The communicating hole 36*d* which allows the first rack 39 to move forward (to the cultivation space 14 direction) is formed on the front wall 36*c*. Further, the front wall 36*c* of the first housing 36 is positioned inside of the edge portion 13*b* of the raising/lowering member 13 of the cultivation space 14 side.

The first longitudinal rack 37 and the first side rack 39 are coupled to the first sprocket 38 and are interlocked with each other. The first longitudinal rack 39 is coupled to the drive device such as motor and etc. Further, the tip of the first side rack 39 is formed to be in "T" letter and this tip contacts with the arm A.

The arm A comprises a cover 40a covering the first housing 36, and a main arm body 40b formed on the bottom of the cover 40a. The cover 40a is configured to contact with the tip of the first side rack 39. That is, at least the part of the arm A is positioned in front of the communicating hole 36d of the front wall 36c of the first housing 36 in the first openings 34. Therefore, the arm A can be housed in the first opening 34, and the arm A can be protruded from the first opening 34 to the cultivation space 14 by moving the first side rack 39 in front direction.

That is, in this arm unit 35, when the first longitudinal rack 37 is moved upward using the drive device, the first sprocket 38 rotates and the first side rack 39 moves forward (to the cultivation space 14 direction) along with the rotation of the first sprocket. And along with the movement of the first side rack 39, the arm A also moves forward and the arm A is protruded outside to the cultivation space 14. On the other hand, when the first longitudinal rack 37 is moved downwardly, the first sprocket 38 rotates and the first side rack 39 moves opposite (back direction, direction to outside of the frame) along with the movement of the first rack 37, and the arm A is housed in the raising/lowering member 13.

The first longitudinal rack 37 can synchronously drive the arms A in the raising/lowering member 13 of vertically different stages. When the numbers of the stages of the cultivation space 14 is large, the work efficiency can be enhanced by synchronizing the vertically positioned arms A. However, the first longitudinal rack 37 may be divided into two or more, and have the upper arm A and the lower arm A to be driven separately and periodically. Further, all the arms A may be driven separately. When all the arms A are independently driven, like shown in FIG. 6, the first sprocket 38 may be directly driven by the drive device D2 and drives the arm A through the first side rack 39, without using the first longitudinal rack 37. Further, the chain which is coupled to the vertically arranged first sprockets 43 and which can give the rotating force to the first sprockets may be applied, and other first interlocking member which has substantially same function may be applied. As for arm unit 35, it is preferable to use the first interlocking member (chain, longitudinal rack, etc.) which moves vertically and transform its force to the arms A moving horizontally. Therefore, the vertically positioned cultivation beds can be lifted and lowered stably by operating the first interlocking member extending vertically in up and down direction, through the vertically positioned arms A.

Further, in this embodiment, four raising/lowering members 13 and four first longitudinal racks 37 are arranged and connected with the shaft. Therefore, all arms in same stage can be synchronously driven. However, the connecting method are not limited, it may be synchronized electricity, using said cultivation bed controlling program.

It is preferable to have the arm A which holds the cultivation bed 12 of the uppermost cultivation space 14 and the arm A which holds the cultivation bed 12 of the lowermost cultivation space 14 to be driven directly like shown in FIG. 6b and have the arms A of between to be driven by the first longitudinal rack 37. In this case, the raising/lowering member 13 can be lifted and lowered in the condition that the uppermost arm A and/or the lowermost arm A are protruded upwardly and/or downwardly. Therefore, the feeding of the cultivation bed 12 to the lowermost cultivation space 14 from the conveying space and the ejection of the cultivation bed 12 to the roof from the uppermost cultivation space 14 can be independently achieved.

Figure 7:
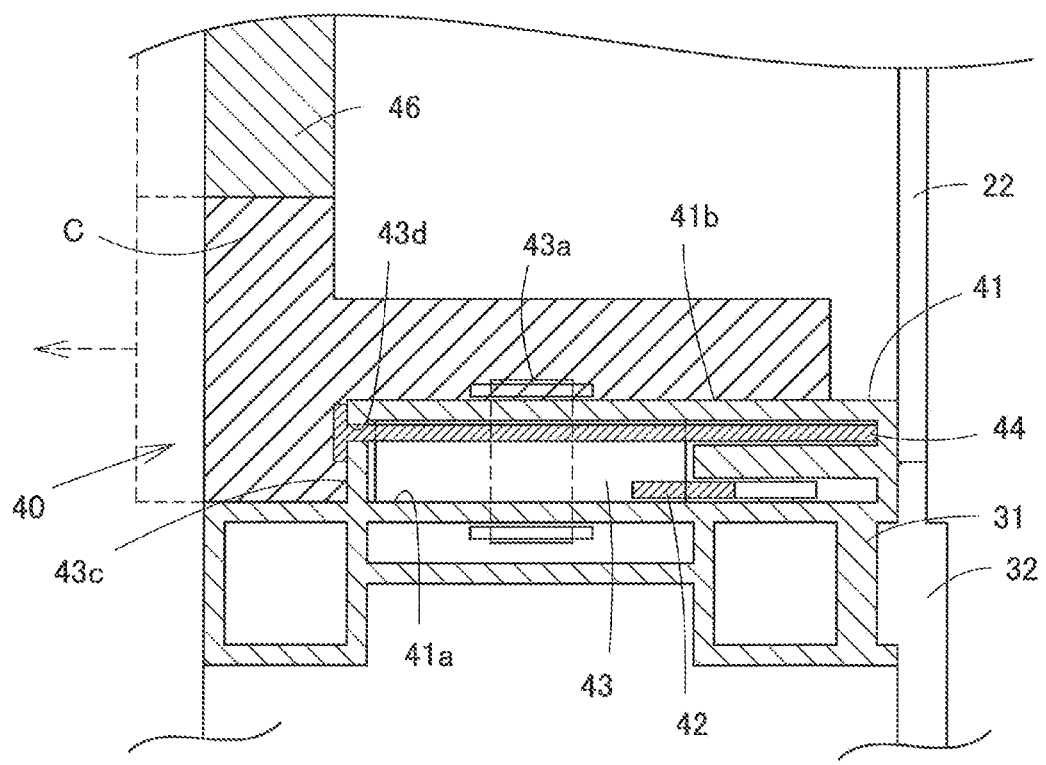
FIG. 7 is a cross sectional view showing a fixing unit of FIG. 1.

Next, the description of the affixing claw unit 40 which moves the affixing claw C in and out is presented referring FIG. 2 and FIG. 7.

The affixing claw unit 40, like shown in FIG. 2, is arranged in the second opening formed on the support column 31 (opposite side of the raising/lowering member 13) and the column 21. The second openings are formed vertically at equal distance on the same height as the arm unit 35. It is preferable that the lid which only allows the affixing claw C to penetrate through is provided on the second opening. In this embodiment, twelve affixing claw units 40 are arranged at each stage. However, the numbers are not limited to this. Further, in this embodiment, the affixing claw unit 40 is set in the support column 31 and column 21, but it may be arranged in the beam 22.

The affixing claw unit 40, like shown in FIG. 7, comprises a second housing 41 housed in the support column 31 and having a penetrating hole 41a penetrating vertically; a second longitudinal rack 42 which is arranged in parallel with the support column 35 by inserting in the penetrating hole 41a, and which connects the affixing claw units 40 of vertical stages; a second sprocket 43 fixed rotatably in the second housing; a second side rack 44 housed movable in the direction to inside and to outside of the cultivation space 14 (front and back direction of FIG. 1); a housing block 45 arranged in parallel with the beam 22 between the support columns 35 or between the support column 35 and column 21; an affixing claw C formed in "T" letter, housed in the housing block 45, and coupled with the tip of the second side rack 44. The second longitudinal rack 42 is provided movably against the second housing 41. A square pipe 46 is provided between the adjacent affixing claw C, and the square pipe 46 also is housed in the housing block (See FIG. 2). The housing block 45 is configured to contact with the inner surface of the side beam 22b or the side wall 24. It may be fixed with each other or the seal material may be laid between them. However, the cultivation bed 12 may be supported only with the affixing claw C and not use the square pipe 46, if the enough strength or intensity can be applied to the affixing claw unit 40, itself.

The second housing 41 is a hollow cuboid with two opening formed on top and bottom, and side walls 41b support the axis 43a of the second sprocket 43. The communicating hole 41d which allows the second rack 44 to go through is formed on the front wall 41c. Further, the front wall 41c of the second housing 41 is positioned inside of the edge of the support column 31 of the cultivation space 14 side.

The second longitudinal rack 42 and the second side rack 44 interlock with each other through the second sprocket 43 which couples with both. And the drive device such as motor or etc. is coupled to the second longitudinal rack 37. Further, the tip of the second side rack 44 is formed to be in "T" letter, so to easily contact with the affixing claw C. However, the configuration of the tip of the second side rack 44 is not limited to this.

The housing block 45 is formed with the depressed portion on the cultivation space 14 side for housing the affixing claw C and the square pipe 46.

At least the part of the affixing claw C is positioned in front of the communicating hole 41d of the front wall 41a of the second housing 41 inside of the second opening. Therefore, the affixing claw C can be housed in the second opening 31a, and the affixing claw C can be protruded from the second opening 31a to the cultivation space 14 by moving the second side rack 44 in front direction.

As well, a current terminal which allow the frame 11 and the cultivation bed 12 to be conducted when engaged may be provided on the affixing claw C and the engaging portion (not shown in the figure) of the cultivation bed 12 to be engaged with said affixing claw C. By providing the current terminal on the affixing claw C and the engaging portion of the cultivation bed 12, the fixing state where the cultivation bed 12 is accurately fixed to the affixing claw C can be confirmed by its conducting condition, after the cultivation bed is raised or lowered and engaged with the affixing claw C. Further, by conducting the current between the frame 11 and the cultivation bed 12, the wiring such as electric cables and etc. can be omitted. Such a current terminal is preferable for the cultivation bed 12 equipped with the light device 29.

Due to the composition of the affixing claw unit 40, the second side rack 45 moves in front and back direction (direction to the inside and to the outside of the cultivation space 14), by lifting and lowering the second longitudinal rack 43 through the second sprocket 44. And the affixing claw and the square pipe 46 will both protrude. The protruded affixing claw C and square pipe 46 will be supporting floor having approximately same length as the side beam 22b. That is the edge of the cultivation bed 12 extending in lengthen direction can all be supported, and hermetical of the vertically adjacent cultivation space 14 partitioned by the cultivation bed 12 can be enhanced. However, the cultivation bed 12 can be only supported by the affixing bed C. If the strength of the affixing claw C is enough, the supporting area will not be limited.

In this embodiment, twelve second longitudinal racks 43 of the affixing claw unit 41 is arranged in same stage, and all or parts may be synchronized, so in and out movement of all or parts of the affixing claw 14 can be synchronized. For example, such synchronization can be achieved by connecting all the second longitudinal racks 43 with the shaft or etc. However, it can be electrically synchronized and interlocked periodically. By interlocking the second longitudinal rack 42, the numbers of the drive device can be reduced.

In this case also like the first longitudinal rack 37, the second longitudinal rack 42 may be divided into two and have the upper affixing claw C and the lower affixing claw C to be driven separately. Further, all of affixing claws may be separately driven. When all are separately driven, the first longitudinal rack 37 may be omitted and have the drive device directly drives the second sprocket 43. Moreover, the uppermost affixing claw C and the lowermost affixing claw C can be directly driven with the drive device D3 and have the other affixing claws C to be driven by the second longitudinal rack 42. Further, the chain which connects the vertically arranged second sprockets 43 and provides the rotative force to the second sprockets 43, may be replaced as the second longitudinal rack 42. Other second interlocking members extending vertically and having same functions may be used. As for the affixing claw unit 40, if a mechanism which transforms the vertical force of the second interlocking members (chain, longitudinal rack, etc.) into the horizontal force of the affixing claw is used, the vertically arranged affixing claws can be synchronized by operating the second interlocking members, and then the vertical arranged cultivation beds can be stably lifted and lowered.

In this embodiment the movement of the affixing claw C is operated by the second side rack 42, however the affixing claw C may be directly connected to the electric actuator, the hydraulic actuator and etc. or the drive unit having the chain formed in loop and the drive device, and have the affixing claw C to be synchronized. In this case, it can be electrically controlled using above cultivation bed controlling program and synchronized or interlocked with the arm.

In the plant cultivation device 10, the cultivation bed 12 is fixed to the frame when cultivating, that is the affixing claw C is ejected from the frame 11 and have it supports the cultivation bed 12. On the other hand, when lifting and lowering the cultivation bed 12, the arm A of the raising/lowering member 13 is ejected to have the cultivation bed 12 be supported by the arm, the affixing claw C is retracted, and the raising/lowering member 13 is ascended or descended. When the cultivation bed 12 is lifted and lowered to the predetermined height, the affixing claw C is once again ejected and the arm A is retracted. And the raising/lowering member 13 is moved back to the predetermined height. Therefore, the cultivation bed 12 can be lifted and lowered freely to any stage.

The cultivation space 14 of FIG. 1 is composed of the side walls 24, the cultivation beds 12, and the air condition 15a or air ventilation 15b. The side walls 24 and the cultivation beds 12 are sealed by engaging the cultivation beds 12, and the affixing claws C and the square pipes 46 connecting the column 21 aligned in longitudinal direction. The air condition 15a and the air ventilation 15b are sealed by engaging the longitudinal bead 22a or the floor of the air condition 15a, etc and the cultivation bed 12. However, the sealing structure is not limited to this. For example, when the square pipe 46 is not used, the sealing member may be arranged on the lateral face of the cultivation bed 12 for the side wall 24 or the side beam 22b to be engaged, or the sealing member may be arranged on the inner surface of the side wall 24 or the side beam 22b for the cultivation bed 12 to be engaged. In case the air condition and the air ventilation are not applied, the cultivation space 14 may not be sealed. In this case, the side wall 24 also may be omitted. The air condition and air ventilation, etc. may be selected according to the types of the plant to be cultivated, or method of the plant cultivation.

In FIG. 1, two plant cultivation devices 10 are built in parallel. However, only one plant cultivation device may be build, and three plant cultivation devices 10 may be built in parallel. The cultivation bed 12 can be efficiently circulated by pairing the plant cultivation device 10 for lifting and the plant cultivation device 10 for lowering like in FIG. 1.

In FIG. 1, the frame 11 is equipped with the beam 22. However, the beam may be omitted and the side wall 24 may be formed along the column 21. Further, in the cultivation plant device 10 of FIG. 1, the affixing claw C is arranged on the column 21 and the support column 31. However, it may be arranged only on the column 21 or the support column 31. Moreover, the affixing claw C may be arranged on the beam 22 or on the beam 22 only. The location of the affixing claw C is not limited, if it is arranged on the frame.

The conveying space 17 is positioned under the lowermost cultivation space 14, but it may also be omitted. Further, the first conveyer 16a on the roof may also be omitted. The structure of the frame is selected according to the method of the cultivation.

In FIG. 1, the air condition 15a and the air ventilation 15b are arranged on the edge of the cultivation space 14 in longitudinal direction. However, it may be arranged in the cultivation space 14, and it may be arranged on the frame and etc. of the cultivation bed 12. In this case, the front wall and the back wall are to be set between columns 21 to close front and back of the cultivation space 14. The location of the air condition 15a and the air ventilation 15b are not limited to this. In FIG. 1, the air is to be circulated through the cultivation space 14 and the duct in the cultivation bed 12. However, the duct may be omitted and have the air flow through the cultivation space 14 in one direction. In this case, the air flow through the cultivation space 14 may be discharged outside, or it may be circulated using vertically adjacent cultivation space 14. Further, in case of omitting the duct 28, the cultivation tub 27 and light device 29 may be arranged adjacently in parallel, so the cultivation tub 27 can cool the light device 29.

In the plant cultivation device 10, the arm A is ejected and retracted using the arm unit 35 having the first longitudinal rack 39 and the first side rack 37. However, the arm A may be directly connected and driven by the chain mechanism, the pneumatic cylinder, the hydraulic cylinder, or the electric actuator which transform the rotative force of the motor into the linear force of front and back direction. In this case, all arms or specific arms may be synchronized or periodically interlocked by electronic control.

Figure 8:
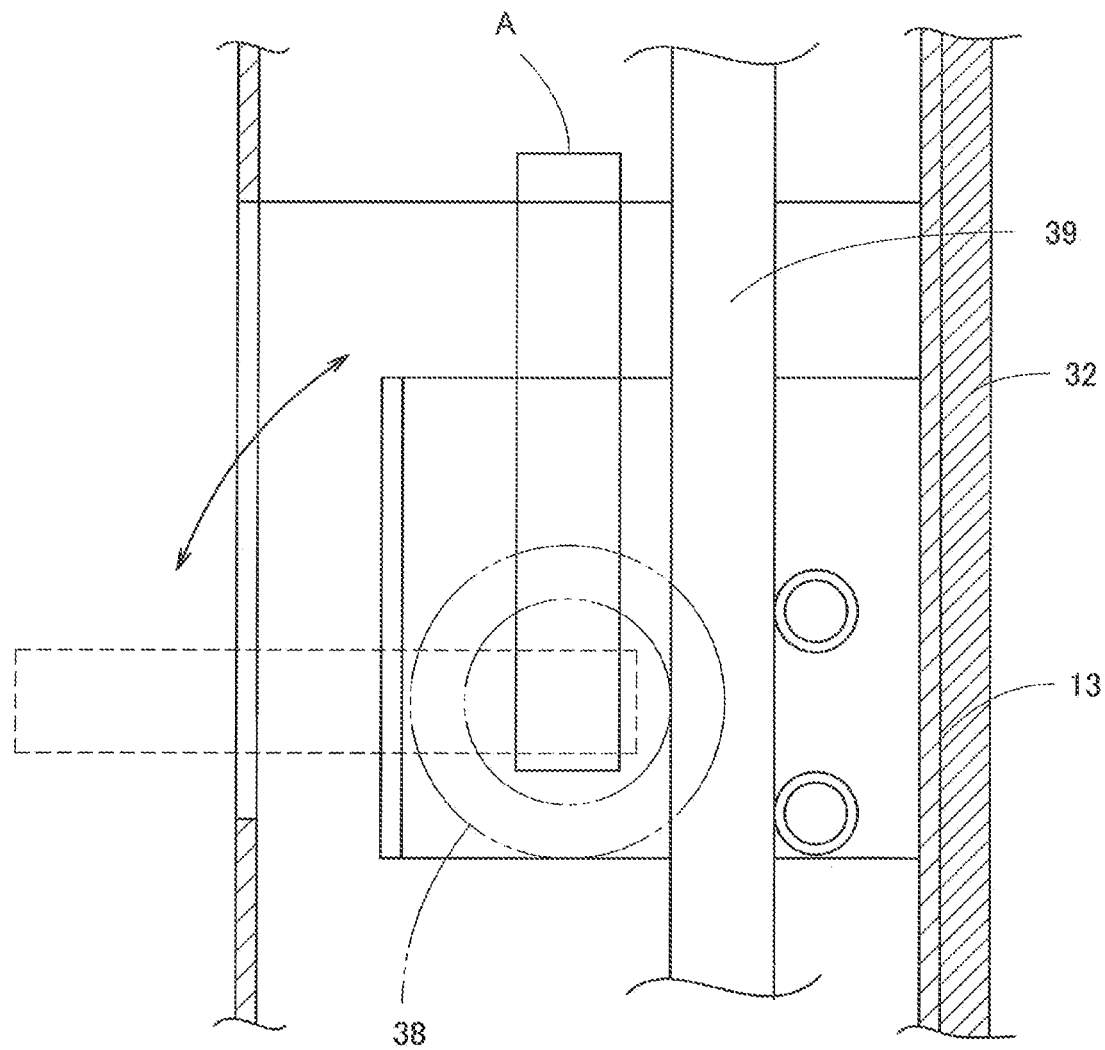
FIG. 8 is a cross sectional view showing the other embodiment of the arm unit.

Further, like the arm A of FIG. 8, the arm unit 35a in which the arm A rotates may be used by having the plate-like or rod-like base of the arm A to be connected to the center axis of the first sprocket 38. In this case also, the arms in different stages may be interlocked using the first longitudinal rack 39 or the first interlocking member extending vertically such as chain or etc. Moreover, in this case also, arms may be separately driven using other drive devices or arms may be synchronized by electric control. The affixing claw C may also be rotatively ejected like in FIG. 8. In this case, the transforming mechanism which transforms the force of the first interlocking member (chain, longitudinal rack, etc.) moving vertically into the rotative force of the rotative arm may be applied. That is, vertically arranged arms are driven by vertically moving the first interlocking member (chain, longitudinal rack, etc.) connected to arms.

Figure 9:
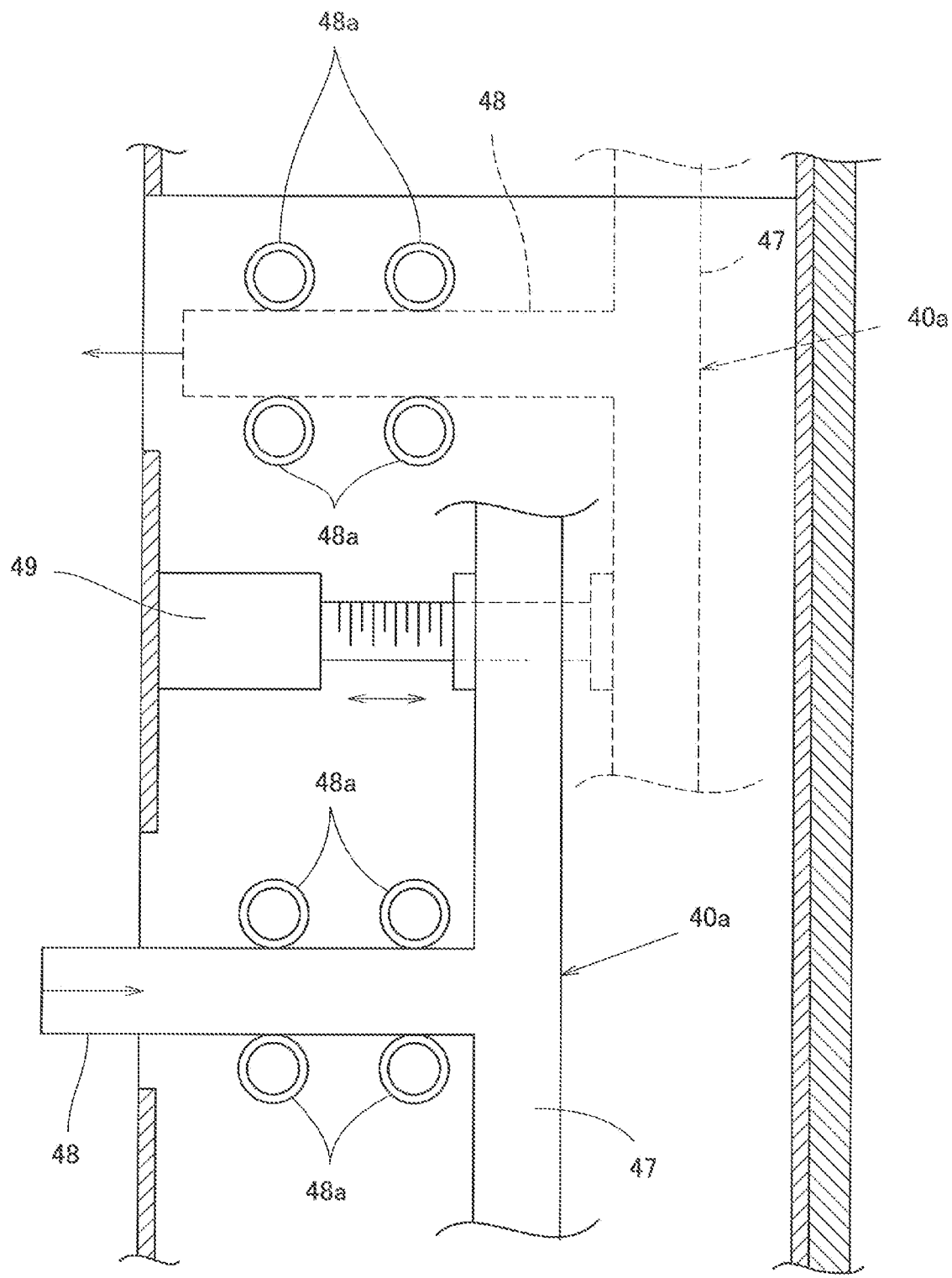
FIG. 9 is a cross sectional view showing the other embodiment of the arm unit.
Figure 10:
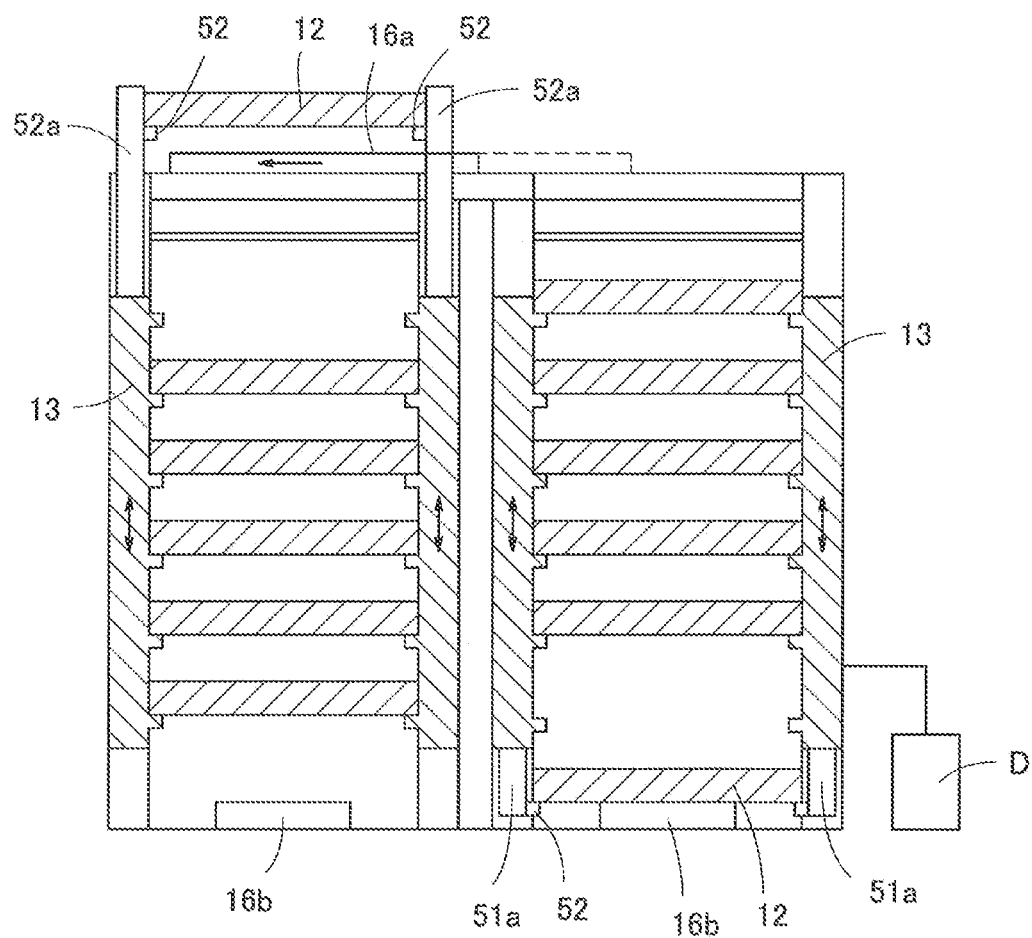
FIG. 10 is a cross sectional view showing another embodiment of the plant cultivation device of the present invention.

For the arm unit of the raising/lowering member 13, like shown in FIG. 9, the arm unit 40a having an axis member 47 extending vertically, an arm 48 protruding forward from the lateral face of the axis member, may be applied. Arms 48 are arranged vertically in equal distance. The number of arms is selected according to the size and specific of the device. The arm unit 40a is housed in the raising/lowering member, movable in front and back direction. The arm 48 is ejected and retracted from the first opening 34 of the raising/lowering member 13 by moving the arm unit 40a in front and back in the raising/lowering member 13 using the drive device 49 such as electric actuator. Note 48a is a support portion which supports the front and back movement of the arm 48. On the inner surface of the raising/lowering member 13 and the height where the drive device 49 is located, the openable window 49a may be arranged to have the overhaul of the drive device 49. In the FIG. 9, the condition where the arm unit 40a is housed is shown in dotted line.

On the raising/lowering member 13 of the plant cultivation device 10 of FIG. 1, a first extending leg 51a extending downward from the bottom and the second extending leg 51b extending upward from the top may be arranged. The first extending leg 51a and the second extending leg 51b are configured to be housed in the raising/lowering member 13 separately from the vertical movement of the raising/lowering member 13. Further, each of the first extending leg 51a and the second extending leg 51b has a second arm 52 which can eject in same direction as the arm 15. Therefore, the cultivation bed 12 supplied into the conveying space 17 can be independently set to the lowermost cultivation space 14, and the cultivation bed 12 on the uppermost cultivation space 14 may be independently carried to the first conveyer 16a, irrespectively to the driving of the raising/lowering member 13. Further, the opposite of above is also possible. However, the uppermost arm A and the lowermost arm A may extend vertically together with the extending of the first extending leg 51a and the second extending leg without the second arms 52. In this case, it is preferable to have the uppermost and lowermost arm to be driven separately against other arms. However, it may be interlocked. It is preferable that the first extending leg 51a and the second extending leg 51b are applied to the plant cultivation device, when the distance between the conveying space 17 and the lowermost cultivation space 14, and the distance between the uppermost cultivation space 14 and the roof is longer than the distance between the adjacent cultivation spaces 14.

Further, between the conveying space 17 and the lowermost cultivation space 14, the cultivation bed 12 may be lifted or lowered by the lifting and lowering device such as table lifter and etc. Moreover, between the uppermost cultivation space 14 and the roof, the cultivation bed 12 may be lifted or lowered by the lifting and lowering device such as crane and etc.

Figures 11A, 11B:
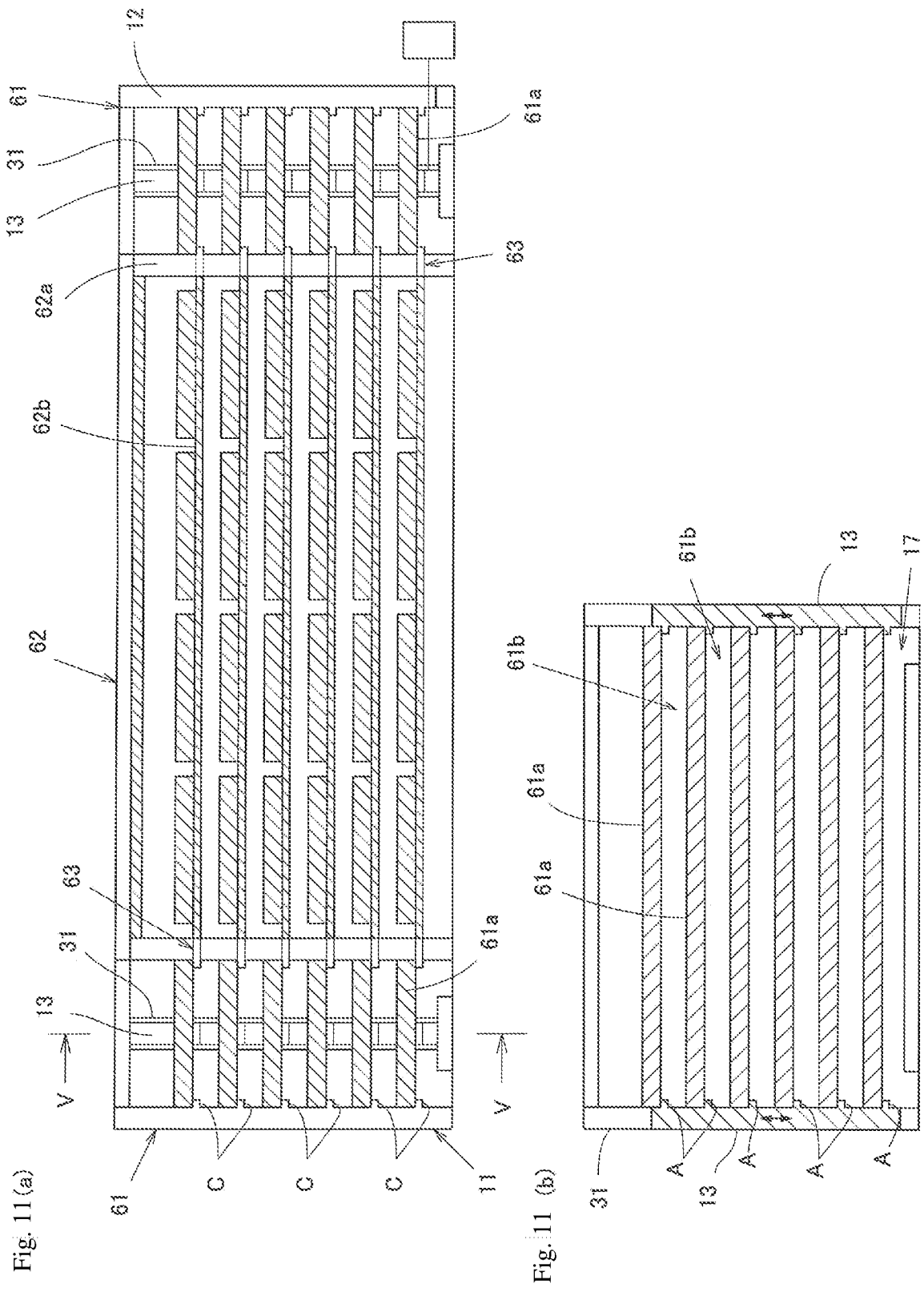
FIG. 11a is a cross sectional view showing an embodiment of the plant cultivation factory.
FIG. 11b is V-V line sectional view.

The plant cultivation factory 60 of FIG. 11 has a plant cultivation bed raising/lowering device 61, and a cultivation shelves 62 having plural stages, where each shelf of the cultivation shelves 62 of the plant cultivation bed raising/lowering device 61 has an openings which can transfer the cultivation bed 61a in and out. Specifically, the plant cultivation bed raising/lowering device 61 is arranged on both edges of the plant cultivation shelves 62 with the cultivation bed transferring device 63 in between. Therefore, one plant cultivation bed raising/lowering device 61 can be used for raising the cultivation bed and the other can be used for lowering the cultivation bed, and allows the cultivation bed to be transferred smoothly. However, the plant cultivation bed raising/lowering device 61 may be arranged on only one side edge of the cultivation shelves 62. In this embodiment, the transferring of the cultivation bed from the plant cultivation bed raising/lowering device 61 to the cultivation shelf 62 is achieved by using the cultivation bed transferring device 63 which transfers the cultivation bed horizontally from the plant cultivation bed raising/lowering device 61 to the cultivation shelves 62. However, the cultivation bed may be transferred by the user itself.

The plant cultivation bed raising/lowering device 61 is equipped with a claw C and a raising/lowering member 13 having an arm. It is substantially same as the plant cultivation device 10 of FIG. 1, except that the spaces 14 partitioned by vertically adjacent cultivation bed are not intended to be used for the plant cultivation space. Therefore, the air condition 15a and the air ventilation 15b are not employed. However, the space 14 may be used as the plant cultivation space and in that case, the air condition and/or air ventilation may be employed.

Specifically, the cultivation bed raising/lowering device 61 has a frame 11, a cultivation beds 61a supported by the affixing claw C of the frame and arranged vertically, a raising/lowering member 13 which drives vertically and which has an arm A engaging with the cultivation bed 61a, and spaces 61b partitioned by the vertically adjacent cultivation bed 61a. The affixing claw C is ejectably provided in the column of the frame, and is driven between the ejected state and the retracted state. The arm A is ejectably provided in the raising/lowering device 13, and is driven between the ejected state and the retracted state. The cultivation bed raising/lowering device 61 is a device which lifts and lowers the cultivation bed 12 to the predetermined stage of the cultivation shelf 62.

Figure 6:
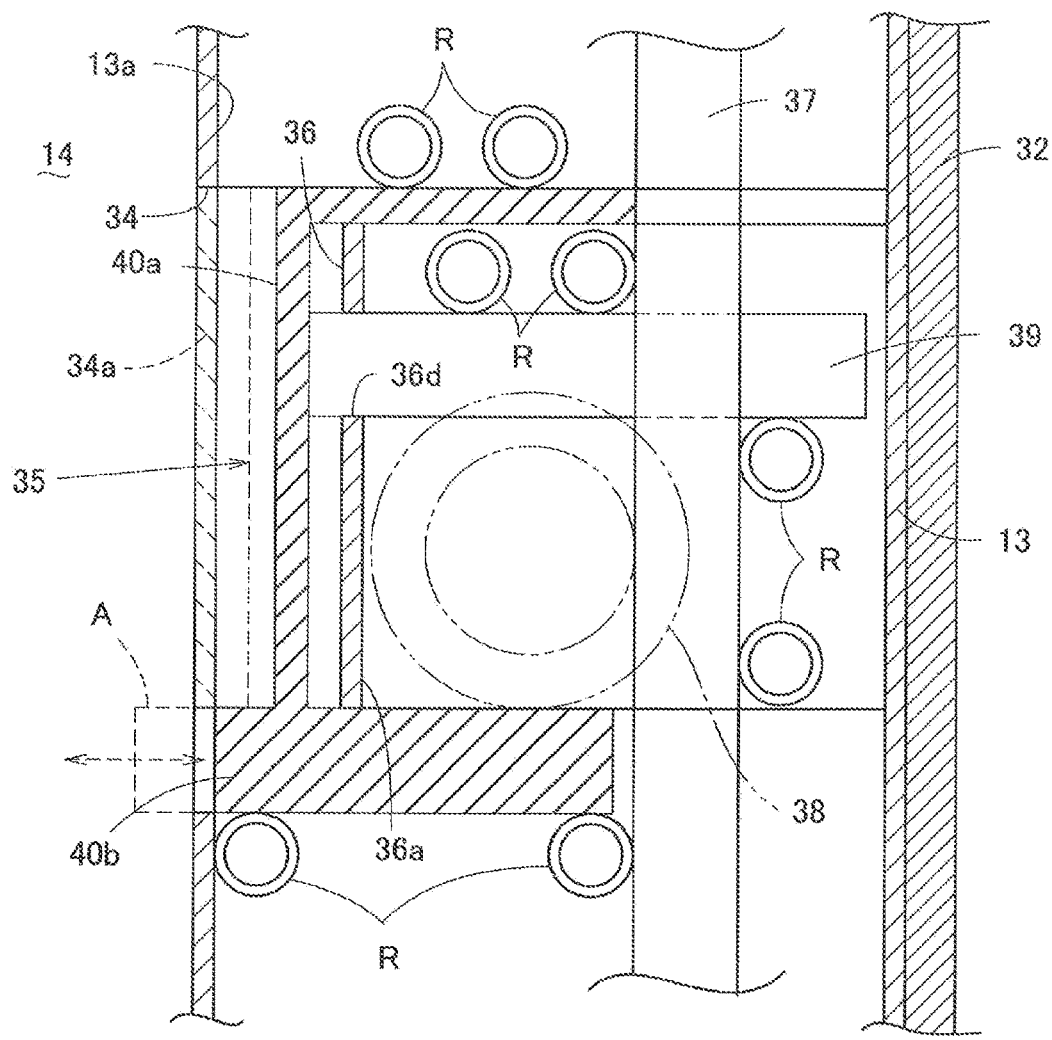
FIG. 6a is W-W line sectional view of FIG. 5
FIG. 6b is a cross sectional view showing another embodiment of the arm unit.
Figure 6:
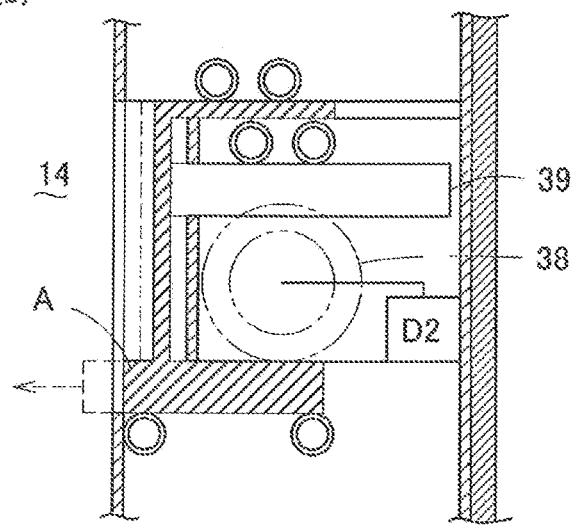

The frame 11 is substantially same as the frame 11 of FIG. 1, and is equipped with the column 12, bead, and the support column 31. The raising/lowering member 13 is also substantially same as the raising/lowering member 13 of FIG. 1. For the arm unit, the arm unit 35 of FIG. 5, the arm unit of FIG. 8 and the arm unit of FIG. 9 may be applied. And the raising/lowering device 13 is movably supported by the support column 31 in vertical direction. However, the raising/lowering member 13 may be supported by the column 12. For the affixing claw, the affixing claw unit 41 of FIG. 6 is applied and is supported by the support column 31. However, for the affixing claw unit 41 also, it may be supported by the column 21, bead, or etc.

On the bottom of the cultivation bed raising/lowering device 61, conveying space 17 for the cultivation bed 61a to be transferred in and out is formed.

The cultivation bed 61a extends in longitudinal direction of the frame 11 and is made to support cultivating plants. Like the cultivation bed 12 of FIG. 1, it may be equipped with the cultivation tub, but in the case where the floor 62b itself of the cultivation shelf 62 is used as the cultivation tub the cultivation tub is not necessary. The cultivation bed 61a may be arranged with the duct and light device like the cultivation bed 12 of FIG. 1. However, it is not necessary, if, for example, applies the light device on the lower surface of the cultivation shelf 62 and applies the duct in the cultivation shelf 62 or between the floor and the cultivation bed like in FIG. 12a, 12b. These can be selected according to the cultivation method and etc.

The cultivation shelves 62 is composed of a column 62a arranged in four corners, and a floors 62b dividing the space formed between the columns 62a in vertical direction. On the upper surface of the floor 62b, a transferring mechanism which transfers the cultivation bed from the upper stream (one cultivation raising/lowering device) to the lower stream (other cultivation raising/lowering device), or which transfer the cultivation bed left and right (from upper stream to lower stream) like in FIG. 11 may be applied. Therefore, the cultivation bed supporting the group of plants in which the growths of the plants are about the same can be shed gradually according to the growth of the plants to be cultivated, and collect the grown group of plants on the down stream. For such a transferring mechanism, a transferring conveyor such as a conveyor belt, a roller conveyor, a chain conveyor, etc. or a tank floating the cultivation bed 12 from the upper stream to the down stream can be applied. On the under surface of the floor 62b, the light device is applied. Therefore, the cultivation bed which is supplied to one end of the plant cultivation space (left end of the figure) can be moved to the other end of the cultivation space, while cultivating. It is preferable to have the air condition and/or the air ventilation to control the environment, such as humidity, carbon dioxide or etc. of the cultivation space in the cultivation shelves 62. In that case, like shown in FIG. 12a, it is preferable to have a space 63c between a lower surface formed by light device 63a and an upper surface formed by the floor plate 63b, and is preferable to use the space 63c as a duct to have the air to be circulated. Further, in this case, it is preferable to cool the light device 63a forming the lower surface of the floor surface 62b with the air supplied to the space 63c. Moreover, in case the air condition and/or air ventilation is applied, it can be made to control the environment of the space 61b of the cultivation bed raising/lowering device 61.

Figure 12:
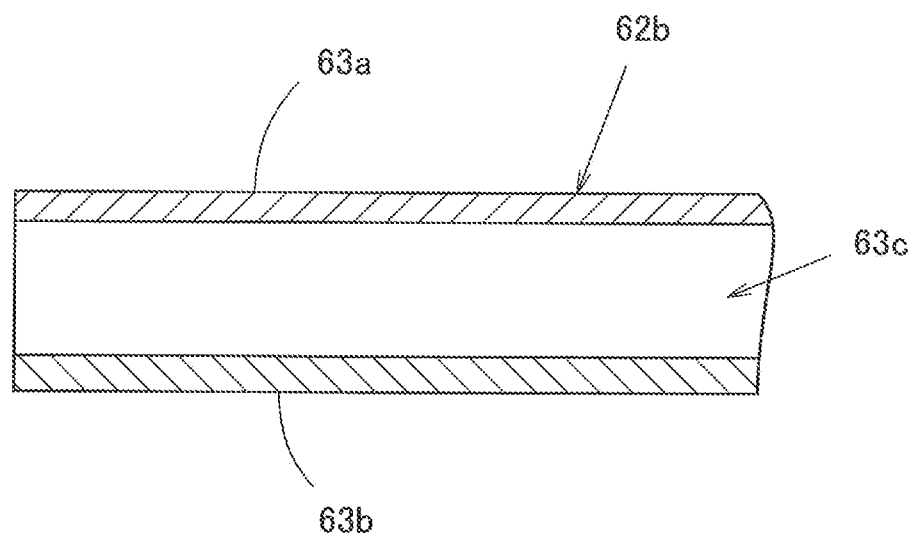
FIG. 12a is a cross sectional view showing an embodiment of the cultivation shelf having a duct therein.
FIG. 12b is a cross sectional view showing an embodiment of the cultivation beds and the floor with a space there between for air conditioning purposes.
Figure 12:
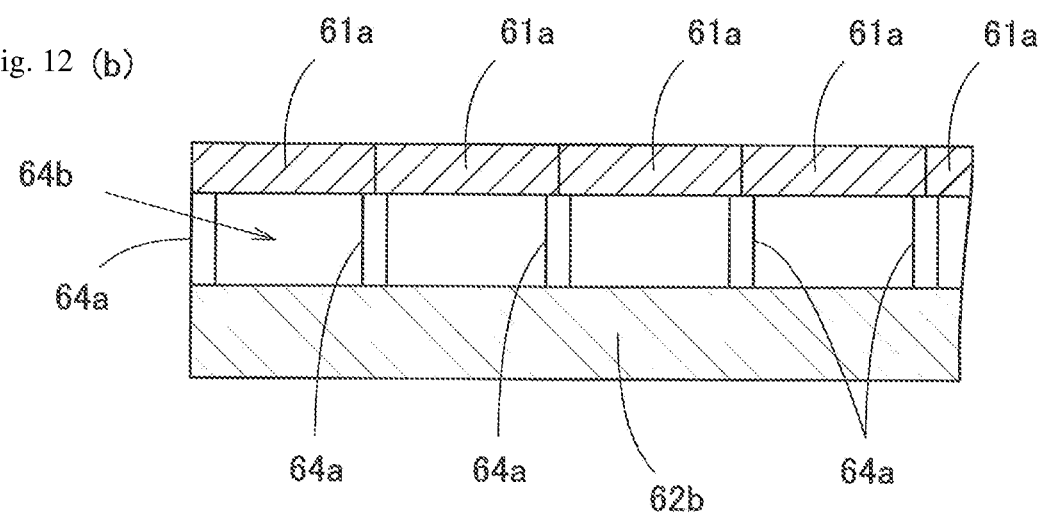

Also like shown in FIG. 12b, the cultivation beds 61a supported by the support leg 64a are to be aligned densely above the floor surface 62b and the space 64b formed between cultivation beds 61a and the floor surface 62b may be used as the duct of air conditioning. In this case, it is preferable to have the sealing material between horizontally adjacent cultivation beds 61a for them coupling them densely. In this case also, it is preferable to structure to have the light device on the lower surface of the floor surface 62b to be cooled.

The cultivation bed transferring device 63 is arranged between the cultivation bed raising/lowering device 61 and the cultivation shelves 62. The cultivation bed transferring device 63 is employed to have the cultivation bed 12 to be transferred horizontally. For example, a transferring conveyor (conveyor belt, roller conveyor, chain conveyor, etc.) or a smooth surface which can slide the cultivation bed 12 from the cultivation bed raising/lowering device 61 to the cultivation shelf 62 may be applied. In this embodiment, the cultivation bed transferring device 63 is coupled to the column 62a of the cultivation shelves 62. The cultivation bed transferring device may or may not be equipped with the power source.

In the plant cultivation plant factory 60, the cultivation bed can be supplied to optional stage of the cultivation shelves. Further, plural of the cultivation beds can be supplied at the same time.

DESCRIPTION OF THE NOTE

A arm
C affixing claw
D raising/lowering drive unit
R roller
10 plant cultivation device
11 frame
11a roof
12 cultivation bed
13 raising/lowering member
13a protruded portion
13b edge portion
14 cultivation space
15a air condition
15b air ventilation
16a first conveyor
16b second conveyor
17 conveying space
17a door
17b light device
21 column
22 beam
22a longitudinal beam
22b side beam
24 side wall
26 frame material
26a space
27 cultivation tub
28 duct
29 light device
30a pipe
30b groove
31 support column
31a depressed portion
32 coupled member
34 first opening
34a lid
35 arm unit 35a arm unit
36 first housing
36a penetrating hole
36b side wall
36c front wall
36d communicating hole
37 first longitudinal rack
38 first sprocket
38a axis
39 first side rack
40 affixing claw unit
40a cover
40b arm body
41 second housing
41a penetrating hole
41b side wall
41c front wall
41d communicating hole
42 second longitudinal rack
43 second sprocket
43a axis
44 second side rack
45 housing block
46 square pipe
51a first extending leg
51b second extending leg
52 second arm
60 plant cultivation factory
61 cultivation raising/lowering device
61a cultivation bed
61b space
62 cultivation shelf
62a column
62b floor
63 cultivation bed transferring device
63a light device
63b floor plate
63c space
64a support leg
64b space

The invention claimed is:

1. A plant cultivation device, comprising:
a frame having columns or columns and beams,
cultivation beds moveably disposed within the frame and positioned one above the other, and each cultivation bed is supported by an affixing claw of the frame and being configured to move between a fixed state and a raising and lowering state, wherein a horizontal position with respect to the frame of each one of the cultivation beds in the fixed state and a horizontal position with respect to the frame of said each one of the cultivation beds in the raising and lowering state are substantially the same,
a raising and lowering member which is equipped with an arm disposed between adjacent cultivation beds and engaging with the cultivation bed to drive the cultivation bed vertically inside the frame, and
cultivation spaces each formed between vertically adjacent cultivation beds,
wherein the affixing claw is driven between a supporting position which supports the cultivation bed and a non-supporting position which does not support the cultivation bed, and
wherein the arm is driven between an engaging position which engages with the cultivation bed and a non-engaging position which does not engages with the cultivation bed.

2. The plant cultivation device according to claim 1, wherein the affixing claw is fixed to the frame storable in the column and/or in the beam.

3. The plant cultivation device according to claim 1, wherein the arm is fixed to the raising and lowering member storable in the raising and lowering member.

4. The plant cultivation device according to claim 1, wherein the raising and lowering member is ascendable beyond an uppermost cultivation space.

5. The plant cultivation device according to claim 1, wherein the raising and lowering member is descendible beyond a lowermost cultivation space.

6. The plant cultivation device according to claim 1, comprising a plurality of raising and lowering members, wherein the arms of the raising and lowering members on a same level are driven synchronously.

7. The plant cultivation device according to claim 1,
wherein the raising and lowering member extends vertically and is equipped with a plurality of arms,
wherein the plurality of arms of the raising and lowering member are positioned one above the other so that an uppermost arm of the plurality of arms is engageable with an uppermost cultivation bed, a lowermost arm of the plurality of arms is engageable with a lowermost cultivation bed, and middle arms of the plurality of arms are engageable with respective ones of cultivation beds located between the uppermost cultivation bed and the lowermost cultivation bed, and
wherein the frame comprises a plurality of affixing claws positioned one above the other so that an uppermost affixing claw of the plurality of affixing claws is engageable with an uppermost cultivation bed, a lowermost affixing claw of the plurality of affixing claws is engageable with a lowermost cultivation bed, and middle affixing claws of the plurality of affixing claws are engageable with respective ones of cultivation beds located between the uppermost cultivation bed and the lowermost cultivation bed, and
wherein the middle arms of the plurality of arms are driven along with each other, and the middle affixing claws of the plurality of affixing claws are driven along with each other.

8. The plant cultivation device according to claim 7, wherein the uppermost affixing claw and the uppermost arm, and/or the lowermost affixing claw and the lowermost arm, are driven separately from the middle affixing claws and/or the middle arms.

9. The plant cultivation device according to claim 1, wherein the cultivation space is sealed between the vertically adjacent cultivation beds.

10. The plant cultivation device according to claim 1, wherein a driving mechanism of the raising and lowering member comprises a rack mechanism, a chain mechanism or a cylinder mechanism.

11. The plant cultivation device according to claim 1, wherein each of the affixing claw and an engaging portion of the cultivation bed which engages with the affixing claw have a current terminal, where the frame and the cultivation bed are to be conducted when engaged.

12. The plant cultivation device according to claim 1, wherein a light device is fixed on a lower surface of the cultivation bed.

13. The plant cultivation device of claim 1, wherein, when the raising and lowering member is driving one of the cultivation beds, the affixing claw is in the non-supporting position.

14. The plant cultivation device device of claim 1, wherein the affixing claw comprises a plurality of affixing claws removably stored in the columns and/or the beams,
wherein the plurality of affixing claws are configured to be driven between a stored state in which the plurality of affixing claws is stored within the columns and/or in the beams and a protruded state in which the plurality of affixing claws protrudes from the columns and/or in the beams,
wherein each cultivation bed is supported by a respective one of the plurality of affixing claws of the frame when the respective one of the plurality of affixing claws is in the protruded state,
wherein the arm comprises at least one arm being movable stored in the raising/lowering member and configured to be driven between a stored state in which the at least one arm is stored within the columns and/or in the beams and a protruded state in which the at least one arm protrudes from the columns and/or in the beams,
wherein each of the affixing claws is driven between a supporting position in which each of the affixing claws is in the protruded state which supports the cultivation bed and a non-supporting position in which each of the affixing claws is in the stored state which does not support the cultivation bed, and
wherein the at least one arm is driven between an engaging position in which the at least one arm is in the protruding state which engages with the cultivation bed and a non-engaging position in which the at least one arm is in the stored state which does not engage with the cultivation bed.

15. A cultivation bed raising and lowering device, comprising,
a frame having columns or columns and beams,
cultivation beds moveably disposed within the frame and positioned one above the other, and each cultivation bed is supported by an affixing claw of the frame and being configured to move between a fixed state and a raising and lowering state, wherein a horizontal position with respect to the frame of each one of the cultivation beds in the fixed state and a horizontal position with respect to the frame of said each one of the cultivation beds in the raising and lowering state are substantially the same,
a raising and lowering member which is equipped with an arm disposed between adjacent cultivation beds and engaging with the cultivation bed to drive the cultivation bed vertically inside the frame, and
spaces each formed between vertically adjacent cultivation beds,
wherein the affixing claw is driven between a supporting position which supports the cultivation bed and a non-supporting position which does not support the cultivation bed, and
wherein the arm is driven between an engaging position which engages with the cultivation bed and a non-engaging position which does not engages with the cultivation bed.

16. The cultivation bed raising and lowering device according to claim 15, wherein the affixing claw is fixed to the frame storable in the column and/or the beam.

17. The cultivation bed raising and lowering device according to claim 15, wherein the arm is fixed to the raising and lowering member storable in the raising/lowering member.

18. The cultivation bed raising and lowering device according to claim 15, wherein the raising and lowering member is ascendable beyond the uppermost cultivation space.

19. The cultivation bed raising and lowering device according to claim 15, wherein the raising and lowering member is descendible beyond the lowermost cultivation space.

20. The cultivation bed raising and lowering device according to claim 15, comprising a plurality of raising and lowering members, wherein the arms of the raising and lowering members on a same level are driven synchronously.

21. The cultivation bed raising and lowering device according to claim 15, wherein the raising and lowering member extends vertically and is equipped with a plurality of arms,
wherein the plurality of arms of the raising and lowering member are positioned one above the other so that an uppermost arm of the plurality of arms is engageable with an uppermost cultivation bed and a lowermost arm of the plurality of arms is engageable with a lowermost cultivation bed, and middle arms of the plurality of arms are engageable with respective ones of cultivation beds located between the uppermost cultivation bed and the lowermost cultivation bed, and
wherein the frame comprises a plurality of affixing claws positioned one above the other so that an uppermost affixing claw of the plurality of affixing claws is engageable with an uppermost cultivation bed, a lowermost affixing claw of the plurality of affixing claws is engageable with a lowermost cultivation bed, and middle affixing claws of the plurality of affixing claws are engageable with respective ones of cultivation beds located between the uppermost cultivation bed and the lowermost cultivation bed, and
wherein the middle arms of the plurality arms are driven along with each other, and the middle affixing claws of the plurality of affixing claws are driven along with each other.

22. The cultivation bed raising and lowering device according to claim 21, wherein the uppermost affixing claw and the uppermost arm, and/or the lowermost affixing claw and the lowermost arm are driven separately from the middle affixing claws and/or the middle arms.

23. The cultivation raising and lowering device according to claim 15, wherein a driven mechanism of the raising and lowering member comprises a rack mechanism, a chain mechanism or a cylinder mechanism.

24. The cultivation bed raising and lowering device of claim 15, wherein, when the raising and lowering member is driving one of the cultivation beds, the affixing claw is in the non-supporting position.

25. The cultivation bed raising and lowering device of claim 15, wherein the affixing claw comprises a plurality of affixing claws removably stored in the columns and/or the beams,
wherein the plurality of affixing claws are configured to be driven between a stored state in which the plurality of affixing claws is stored within the columns and/or in the beams and a protruded state in which the plurality of affixing claws protrudes from the columns and/or in the beams,
wherein each cultivation bed is supported by a respective one of the plurality of affixing claws of the frame when the respective one of the plurality of affixing claws is in the protruded state, wherein the arm comprises at least one arm being movable stored in the raising/lowering member and configured to be driven between a stored state in which the at least one arm is stored within the columns and/or in the beams and a protruded state in which the at least one arm protrudes from the columns and/or in the beams, wherein each of the affixing claws is driven between a supporting position in which each of the affixing claws is in the protruded state which supports the cultivation bed and a non-supporting position in which each of the affixing claws is in the stored state which does not support the cultivation bed, and wherein the at least one arm is driven between an engaging position in which the at least one arm is in the protruding state which engages with the cultivation bed and a non-engaging position in which the at least one arm is in the stored state which does not engage with the cultivation bed.

26. A plant cultivation factory, comprising;

a cultivation bed raising and lowering device according to claim 17, plant cultivation shelves having multi-stage plant cultivation spaces, wherein the plant cultivation factory is configured to have the cultivation bed be transferred from the cultivation bed raising and lowering device to the plant cultivation spaces of the plant cultivation shelves.

27. The plant cultivation factory, according to claim 26, comprising, a cultivation bed transferring device which transfers the cultivation bed from the cultivation bed raising and lowering device to the plant cultivation spaces of the plant cultivation shelves.

* * * * *